(12) United States Patent
Jutterstrom

(10) Patent No.: US 9,770,720 B2
(45) Date of Patent: Sep. 26, 2017

(54) METHOD FOR SORTING A COLLECTION OF BODIES COMPRISING CEMENTED CARBIDE BODIES AND NON-CEMENTED CARBIDE BODIES

(71) Applicant: SANDVIK INTELLECTUAL PROPERTY AB, Sandviken (SE)

(72) Inventor: Ulf Jutterstrom, Stockholm (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/730,279

(22) Filed: Jun. 4, 2015

(65) Prior Publication Data
US 2015/0352560 A1 Dec. 10, 2015

(30) Foreign Application Priority Data

Jun. 5, 2014 (EP) .................................... 14171294

(51) Int. Cl.
| | |
|---|---|
| *B03B 5/60* | (2006.01) |
| *B03B 5/28* | (2006.01) |
| *B03B 5/44* | (2006.01) |
| *C01B 31/00* | (2006.01) |
| *C22C 29/00* | (2006.01) |
| *C22B 7/00* | (2006.01) |

(Continued)

(52) U.S. Cl.
CPC ................ *B03B 5/28* (2013.01); *B03B 5/442* (2013.01); *C01B 31/00* (2013.01); *C22B 7/004* (2013.01); *C22C 12/00* (2013.01); *C22C 29/00* (2013.01); *B22F 8/00* (2013.01); *B22F 2009/001* (2013.01); *Y02P 10/228* (2015.11); *Y02P 10/24* (2015.11); *Y02W 30/541* (2015.05)

(58) Field of Classification Search
CPC .. B03B 5/28; B03B 5/44; B03B 5/442; B03B 5/447; C22B 7/004; C22C 12/00; C22C 13/00; C22C 13/02; C22C 29/00
USPC ................ 209/172, 174, 175, 178, 181, 182
See application file for complete search history.

(56) References Cited

U.S. PATENT DOCUMENTS 2,208,758 A * 7/1940 Foulke .................... B03B 5/442
  209/172
3,595,484 A  7/1971 Barnard et al.
(Continued)

FOREIGN PATENT DOCUMENTS

WO  2014045579 A1  3/2014

*Primary Examiner* — Joseph C Rodriguez
*Assistant Examiner* — Kalyanavenkateshware Kumar
(74) *Attorney, Agent, or Firm* — Corinne R. Gorski

(57) ABSTRACT

The disclosure relates to a method for sorting a collection of bodies including cemented carbide bodies and non-cemented carbide bodies. A melt having one or more of bismuth, tin and lead and having a density in the range of 7.0-12.0 g/cm³ is provided. The collection is subjected to a sorting process based on density difference by providing the collection in the melt and allowing the bodies to be sorted into a first group at a top surface of the melt and a second group at a bottom of the melt. The first group includes non-cemented carbide bodies having a density lower than the density of the melt and the second group includes cemented carbide bodies having a density higher than the density of the melt. The present disclosure also relates to a method for recycling of cemented carbides comprising the sorting method and recycling of the second group.

16 Claims, 1 Drawing Sheet

(51) Int. Cl.
  *C22C 12/00*   (2006.01)
  *B22F 8/00*    (2006.01)
  *B22F 9/00*    (2006.01)

(56) References Cited

U.S. PATENT DOCUMENTS

| | | |
|---|---|---|
| 3,947,555 A | 3/1976 | MacInnis et al. |
| 4,348,231 A | 9/1982 | Ritsko et al. |
| 4,772,339 A | 9/1988 | Ekemar et al. |
| 6,335,376 B1 * | 1/2002 | Allen, III ................ B03B 1/00 521/40 |
| 9,328,398 B2 * | 5/2016 | Xu .......................... B03B 9/061 |
| 2006/0213330 A1 * | 9/2006 | Hsieh ....................... C22B 5/10 75/403 |
| 2010/0263483 A1 * | 10/2010 | Liubakka ................ C22B 1/00 75/10.13 |

* cited by examiner

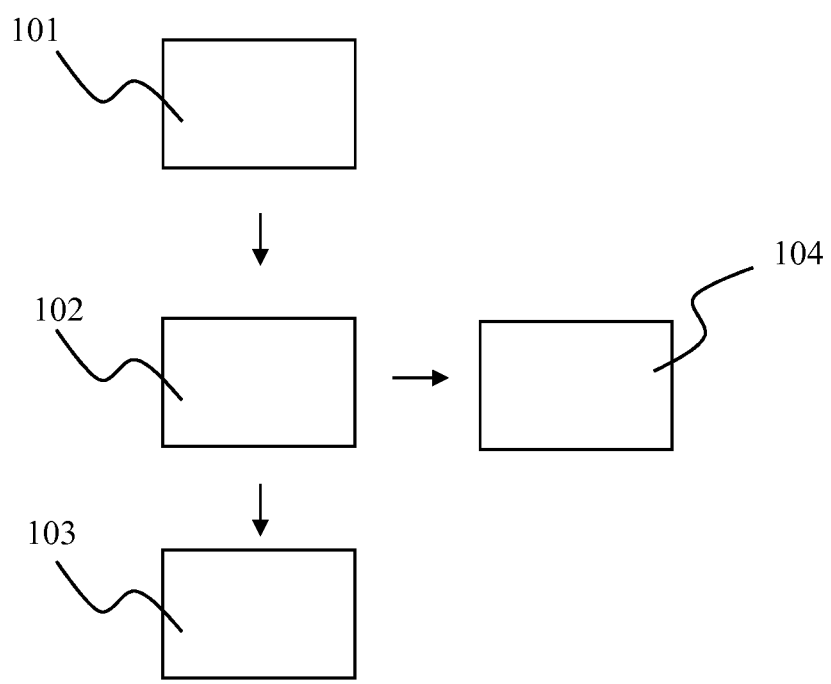

METHOD FOR SORTING A COLLECTION OF BODIES COMPRISING CEMENTED CARBIDE BODIES AND NON-CEMENTED CARBIDE BODIES

RELATED APPLICATION DATA

This application claims priority under 35 U.S.C. §119 to EP Patent Application No. 14171294.3, filed Jun. 5, 2014, which the entirety thereof is incorporated herein by reference.

TECHNICAL FIELD

The present disclosure relates to a method for sorting a collection of bodies including cemented carbide bodies and non-cemented carbide bodies, such as e.g. cermet bodies, ceramic bodies and steel bodies, and a method for recycling of cemented carbides.

BACKGROUND

Cemented carbides are widely utilized in a broad range of applications today. For example, cemented carbides are utilized in cutting tools, mining tools and wear parts. Accordingly, a huge amount of discarded cemented carbide bodies is produced every year.

For economic reasons the ability to recycle/recover cemented carbides from discarded or unused cemented carbide bodies, i.e. cemented carbide scrap, is of great interest since the raw materials used in production of new cemented carbide bodies are expensive. Furthermore, the ability to recycle cemented carbides is also of great interest for environmental reasons. The use of recycled material in production of new cemented carbide bodies reduces the energy consumption and the environmental impact significantly as compared to the use of virgin raw materials.

Recycling/recovery of cemented carbides from discarded or unused cemented carbide bodies may be performed by degradation to powder by chemical, metallurgical or mechanical processes. Commonly utilized processes for recycling of cemented carbides by degradation to powder are, for example, the "cold stream process" and the "zinc process". The "cold stream process" provides a mechanical disintegration of cemented carbide bodies to powders of hard constituents and binder metals. The "zinc process" is characterized by a transformation of cemented carbide bodies to powder by metallurgical means. In the "zinc process" the cemented carbide bodies are immersed into molten zinc in an electrical furnace. Zinc is then brought to diffuse into the cemented carbide and to alloy itself with the binder metal, usually cobalt. Thereby the cemented carbide disintegrates into powder. The zinc is then distilled at a certain temperature and is thus removed from the furnace, whereby the remaining powder comprises WC and the binder metal separated from each other. The "zinc process" is described in, for example, U.S. Pat. No. 3,595,484.

During recent years the amount of utilized recycled material in production of new cemented carbide bodies has increased. However, as a result the purity requirements of the recycled material have also increased, i.e. the allowable proportion of undesired material remaining in the recycled material has been lowered.

Usually, collections of discarded or unused bodies, such as cutting tools, mining tools, wear parts, etc., to be introduced into a process for recycling of cemented carbides include not only bodies of cemented carbide but also non-cemented carbide bodies, i.e. bodies of other materials such as e.g. cermets, ceramics and steel. However, non-cemented carbide bodies often include elements and/or compounds that are undesired in recycled material to be used for production of new cemented carbide bodies. Thus, non-cemented carbide bodies that are present in a collection of bodies introduced into a process for recycling of cemented carbides can make the obtained recycled material unsuitable as raw material for production of new cemented carbide bodies.

Many cermet materials have a high content of nitrogen. The nitrogen originating from cermet bodies is not removed during a recycling process for recycling of cemented carbides. Thus, in case cermet bodies are present in a collection of bodies introduced into a process for recycling of cemented carbides, nitrogen will be present in the obtained recycled material. A too high degree of nitrogen in the recycled material can form an undesirable concentration gradient of the gamma phase during sintering when the recycled material is utilized in production of new cemented carbide bodies. Such a gradient is not desired in all cemented carbide grades.

Furthermore, many cermet materials also contain other elements and/or compounds that make the recycled material unsuitable as raw material for the manufacture of at least certain cemented carbide grades. For example, many cermet materials include nickel and/or titanium. These elements are commonly used as property enhancing additions in a variety of cemented carbide grades. However, for certain other grades these elements are unwanted or even detrimental to the properties.

In addition, ceramic materials and steel materials include elements and/or compounds that may make the obtained recycled material unsuitable as raw material for the manufacture of at least certain cemented carbide grades.

Thus, in order to fulfill the purity requirements of recycled cemented carbide materials, there is a need to separate non-cemented carbide bodies, in particular cermet bodies, from a collection of bodies, which is intended to be introduced into a process for recycling of cemented carbides, before start of the recycling process. In addition, there is a need to perform the separation in a simple and cost-effective way.

SUMMARY

Accordingly, one aspect of the present disclosure is to provide a method for sorting a collection of bodies including cemented carbide bodies and non-cemented carbide bodies that enables separation of non-cemented carbide bodies, in particular cermet bodies, from cemented carbide bodies in a simple and cost-effective way.

This is achieved by a method for sorting a collection of bodies including cemented carbide bodies and non-cemented carbide bodies, whereby the method comprises the steps of:

providing a melt comprising one or more of bismuth, tin and lead and having a density in the range of from 7.0 $g/cm^3$ to 12.0 $g/cm^3$, subjecting the collection to a sorting process based on density difference by providing the collection in said melt and allowing the collection to be sorted into a first group of bodies collected at a top surface of the melt and a second group of bodies collected at a bottom of the melt based on the density difference, the first group of bodies comprising non-cemented carbide bodies of the collection having a density lower than the density of the melt and the second group of bodies comprising cemented carbide bodies having a density higher than the density of the melt;

separating the first group of bodies from the melt, and separating the second group of bodies from the melt.

Further embodiments of the sorting method according to the present disclosure are listed in the dependent claims.

Another object of the present disclosure is to provide a method for recycling of cemented carbides, which results in an improved purity of the recycled material.

This object is achieved with a method for recycling of cemented carbides comprising the steps of:

sorting a collection of bodies including cemented carbide bodies and non-cemented carbide bodies according to the sorting method according to the present disclosure so as to obtain a separate first group of bodies comprising non-cemented carbide bodies and a separate second group of bodies comprising cemented carbide bodies, and recycling the second group of bodies.

Still other aspects and features of the present disclosure will become apparent from the following detailed description considered in conjunction with the accompanying drawings.

DEFINITIONS

By "cemented carbide" is herein meant a hard metal mainly based on a hard phase of tungsten carbide and a binder phase of, for example, Co, Ni, Fe and/or Mo. The hard metal may also include small amounts of further components such as, for example, carbides, nitrides and/or carbonitrides of Ta, Ti, Nb and/or Cr. Other alloying elements may also be present in the hard metal.

By "cermet" is herein meant a non-cemented carbide material mainly based on titanium carbonitride, titanium carbide and/or titanium nitride and a binder phase of, for example, Co and/or Ni. In addition, the cermet material may also include further components such as, for example, group IVa, Va and/or VIa elements. The cermet material includes no free hexagonal WC. Cermet materials based on titanium carbonitride are the most common cermet materials today.

BRIEF DESCRIPTION OF DRAWINGS

FIG. 1 is a schematic flow diagram illustrating the steps of an embodiment of the sorting method according to the present disclosure.

DETAILED DESCRIPTION OF THE INVENTION

As mentioned above the present disclosure relates to a method for sorting a collection of bodies including cemented carbide bodies and non-cemented carbide bodies. Embodiments of the sorting method according to the present disclosure will be described in more detail in the following.

FIG. 1 shows a schematic flowchart of one embodiment of the sorting method according to the present disclosure. The embodiment shown in FIG. 1 includes first, second, third and fourth treatment steps 101-104.

In the embodiment of the sorting method according to the present disclosure shown in FIG. 1, a melt is provided in the first treatment step 101. The melt includes one or more of bismuth, tin and lead. Furthermore, the melt has a density in the range of from 7.0 g/cm$^3$ to 12.0 g/cm$^3$.

In the second treatment step 102 of the present disclosure shown in FIG. 1, a collection of bodies including cemented carbide bodies and non-cemented carbide bodies to be sorted is subjected to a sorting process based on density difference. The collection of bodies is subjected to the sorting process by providing the collection of bodies in the melt, which was provided in the first treatment step 101, and allowing the collection of bodies to be sorted into a first group of bodies collected at a top surface of the melt and a second group of bodies collected at a bottom of the melt based on the density difference between the density of the melt and the density of the bodies.

The melt may be provided in a vessel in the first treatment step 101 and the collection of bodies may then be provided in the melt in the second treatment step 102 by feeding the collection of bodies into the melt in the vessel. Alternatively, the collection of bodies is provided in a vessel and the collection of bodies is provided in the melt in the second treatment step 102 by feeding the melt into the vessel containing the collection of bodies (e.g. by pouring the melt onto the collection of bodies in the vessel).

Thus, in the second treatment step 102 the collection of bodies is provided in the melt and the bodies are allowed to rise to the top surface of the melt or sink to the bottom of the melt depending on their density compared to the density of the melt. Those bodies having a density that is lower than the density of the melt rise to the top surface of the melt and form the first group of bodies. Likewise, those bodies having a density that is higher than the density of the melt sink to the bottom of the melt and form the second group of bodies.

There are many different grades of cemented carbides and cermets on the market today. However, most cemented carbide grades have a density in the range of 11.0-15.0 g/cm$^3$ and most cermet grades have a density in the range of 6.0-8.0 g/cm$^3$. Furthermore, ceramic materials have a density well below 6.0 g/cm$^3$ and most steel materials, such as high speed steel, have a density around 8.0 g/cm$^3$, i.e. about 7.7-8.1 g/cm$^3$.

As mentioned above, the melt of the embodiment of the sorting method shown in FIG. 1 has a density in the range of from 7.0 g/cm$^3$ to 12.0 g/cm$^3$. Thus, bodies of all or at least some, depending on the specific density of the melt, cemented carbide grades are sorted into the second group of bodies collected at the bottom of the melt due to the density difference between the melt and the cemented carbide bodies in the second treatment step 102. Likewise, bodies of all or at least some, depending on the density of the melt, cermet grades are sorted into the first group of bodies collected at the top surface of the melt due to the density difference between the melt and the cermet bodies in the second treatment step 102. In addition, other non-cemented carbide bodies than cermet bodies such as, for example, ceramic bodies and steel bodies may also, depending on the density of the melt, be sorted into the first group of bodies collected at the surface of the melt in the second treatment step 102.

In case the density of the mel is in the range of 8.0-11.0 g/cm$^3$, bodies of all or at least most cemented carbide grades are sorted into the second group of bodies collected at the bottom of the melt (since most cemented carbide grades have a density in the range of 11.0-15.0 g/cm$^3$) and bodies of all or at least most cermet grades, ceramic grades and steel grades are sorted into the first group of bodies collected at the top surface of the melt (since most of these grades have a density lower than 8.0 g/cm$^3$) in the second treatment step 102.

In case the density of the melt is in the range of 11.0-12.0 g/cm$^3$, bodies of all cemented carbide grades having a density that is higher than the density of the melt are sorted into the second group of bodies collected at the bottom of the melt, whereas bodies of cemented carbide grades having a density that is lower than the density of the melt, cermet grades, ceramic bodies and bodies of steel are sorted into the first group of bodies collected at the top surface of the melt in the second treatment step 102. Likewise, in case the density of the melt is in the range of 7.0-8.0 g/cm$^3$, bodies of all cermet grades, ceramic grades and steel grades having a density that is lower than the density of the melt are sorted into the first group of bodies collected at the top surface of the melt, whereas bodies of cermet grades, ceramic grades and steel grades having a density that is higher than the density of the melt and cemented carbide bodies are sorted into the second group of bodies collected at the bottom of the melt in the second treatment step 102.

Accordingly, the first group of bodies collected at the top surface of the melt by means of the sorting process in the second treatment step 102 includes at least non-cemented carbide bodies having a density that is lower than the density of the melt, but may also include bodies of some cemented carbide grades depending on the density of the melt. The second group of bodies collected at the bottom of the melt by means of the sorting process in the second treatment step 102 includes at least cemented carbide bodies having a density that is higher than the density of the melt, but may also include non-cemented carbide bodies of some grades depending on the density of the melt.

In the embodiment of the sorting method according to the present disclosure shown in FIG. 1, the first group of bodies is separated from the melt in the third treatment step 103 and the second group of bodies is separated from the melt in the fourth treatment step 104. The separation steps 103, 104 may be performed in any suitable way and in any suitable order. Thus, the separation of the first group of bodies may be performed before the separation of the second group of bodies. However, alternatively the separation of the second group of bodies may be performed before the separation of the first group of bodies. Still alternatively, the two separation steps may be performed simultaneously or partly simultaneously.

The second group of bodies may thereafter be utilized in a process for recycling of cemented carbides. The recycling may be performed by means of any suitable method known in the art such as e.g. degradation to powder by a chemical, metallurgical or mechanical process. For example, the "cold stream process" or the "zinc process" may be utilized.

Thus, by providing a collection of bodies including cemented carbide bodies and non-cemented carbide bodies in the melt having a density in the range of 7.0-12.0 g/cm$^3$, non-cemented carbide bodies, such as e.g. cermet bodies, ceramic bodies and steel bodies, of the collection having a density lower than the density of the melt are separated from the remainder of the collection including cemented carbide bodies having a density higher than the density of the melt.

Consequently, the method according to the present disclosure enables separation of non-cemented carbide bodies, such as cermet bodies, ceramic bodies and steel bodies, from a collection of bodies comprising cemented carbide bodies and non-cemented carbide bodies, whereby a higher purity of the material recycled from the collection of bodies may be achieved. By enabling separation of cermet bodies from the collection of bodies, a lower content of nitrogen, nickel and titanium in the material recycled from the collection of bodies may be achieved. A lower content of nitrogen in the recycled material implies that undesirable concentration gradients of the gamma phase during sintering can be avoided when the recycled material is utilized in production of new cemented carbide bodies. In addition, by also enabling separation of ceramic bodies and steel bodies a lower content of other unwanted elements and/or compounds in the material recycled from the collection may also be achieved.

Another aspect of the method according to the present disclosure is that it is simple and uncomplicated to adapt industrially. This implies that the collection of bodies comprising cemented carbide bodies and non-cemented carbide bodies may be sorted in a simple and cost-effective way.

As mentioned above, the melt provided in the first treatment step 101 of the embodiment of the sorting method according to the disclosure shown in FIG. 1 includes one or more of bismuth, tin and lead. Thus, the melt may include one or more of bismuth, tin and lead, but may also include one or more further constituents, such as e.g. one or more further alloying elements, admixed elements and/or compounds and/or impurities. For example, the further constituents/alloying element(s) may be selected from the group of: silver, copper, mercury, cadmium, antimony and zinc.

Furthermore, as mentioned above, the melt provided in the first treatment step 101 of the embodiment of the sorting method according to the disclosure shown in FIG. 1 has a density in the range of from 7.0 g/cm$^3$ to 12.0 g/cm$^3$. However, in another embodiment the melt has a density in the range of from 8.0 g/cm$^3$ to 11.0 g/cm$^3$. In still another embodiment the melt has a density in the range of from 8.0 g/cm$^3$ to 10.0 g/cm$^3$. In yet another embodiment, the melt has a density in the range of from 8.0 g/cm$^3$ to 9.5 g/cm$^3$. In a further embodiment, the melt has a density in the range of from 8.5 g/cm$^3$ to 10.5 g/cm$^3$. In a still further embodiment, the melt has a density in the range of from 8.5 g/cm$^3$ to 10.0 g/cm$^3$. In another embodiment, the melt has a density in the range of from 8.5 g/cm$^3$ to 9.8 g/cm$^3$. In a still further embodiment, the melt has a density in the range of from 8.5 g/cm$^3$ to 9.5 g/cm$^3$.

In case the density of the melt is in the range of from 8.0 g/cm$^3$ to 11.0 g/cm$^3$, or in the range of from 8.0 g/cm$^3$ to 10.0 g/cm$^3$, or in the range of from 8.0 g/cm$^3$ to 9.5 g/cm$^3$, or in the range of from 8.5 g/cm$^3$ to 10.5 g/cm$^3$, or in the range of from 8.5 g/cm$^3$ to 10.0 g/cm$^3$, or in the range of from 8.5 g/cm$^3$ to 9.8 g/cm$^3$, or in the range of from 8.5 g/cm$^3$ to 9.5 g/cm$^3$, at least most of the cemented carbide bodies of the collection to be sorted are sorted into the second group of bodies collected at the bottom of the melt (since most cemented carbide grades have a density in the range of from 11.0 g/cm$^3$ to 15.0 g/cm$^3$) and at least most of the cermet bodies, ceramic bodies and steel bodies of the collection to be sorted are sorted into the first group of bodies collected at the top surface of the melt (since most of these grades have a density less 8.0 g/cm$^3$.

In all embodiments, the process temperature of the melt, i.e. the target temperature for heating of the melt, is selected to be higher than the solidification temperature of the melt. Preferably, the process temperature is at least 20° C. or 30° C. or 50° C. higher than the solidification temperature of the melt. Furthermore, suitably the composition of the melt is selected such that the melt has as low solidification temperature as possible such that as low process temperature of the melt as possible may be utilized. For example, a solidification temperature of <350° C., or <300° C., or <200° C. or <150° C. and a process temperature of <400° C., or <350° C., or <250° C. or <200° C. may be preferred.

Alternatively, the melt provided in the first treatment step 101 may consist of one or more of bismuth, tin and lead and possibly unavoidable impurities. Thus, the melt may consist of bismuth, tin or lead. In one embodiment, the melt consists of bismuth. In another embodiment, the melt consists of tin. In still another embodiment, the melt consists of lead.

Still alternatively, the melt provided in the first treatment step 101 may be of two or more of bismuth, tin and lead and possibly unavoidable impurities, i.e. the melt may consist of a mixture (or an alloy) of two or more of bismuth, tin and lead and possibly unavoidable impurities.

Accordingly, the melt may be of one of bismuth, tin and lead. However, by utilizing a melt of a mixture being two or more of bismuth, tin and lead instead of a melt consisting of only bismuth, tin or lead, a lower solidification temperature of the melt may be obtained. For example, by utilizing a melt consisting of a mixture consisting of bismuth and tin instead of a melt of only bismuth, a lower solidification temperature of the melt may be obtained. In particular, a significantly lower solidification temperature is obtained when the mixture has a eutectic composition or a composition close to or in an area around the eutectic composition.

In one embodiment, the melt is a mixture consisting of bismuth and tin and possibly unavoidable impurities. Any suitable composition and, thus, density of the mixture may be utilized. However, in one embodiment the density of the melt consisting of a mixture consisting of bismuth and tin, and possibly unavoidable impurities, is in the range of from 8.0 g/cm$^3$ to 9.5 g/cm$^3$. In another embodiment the density of the melt consisting of a mixture consisting of bismuth and tin, and possibly unavoidable impurities, is in the range of from 8.5 g/cm$^3$ to 9.5 g/cm$^3$. Furthermore, the composition of the mixture consisting of bismuth and tin, and possibly unavoidable impurities, may be selected such that the mixture has a low solidification temperature, whereby a low process temperature may be utilized. For example, the mixture may have such a composition that the solidification temperature of the mixture is <200° C., or <175° C., or <150° C. In one embodiment the mixture includes 40.0-75.0 wt % bismuth and 25.0-60.0 wt % tin. In another embodiment the mixture includes 55.0-62.0 wt % bismuth and 38.0-45.0 wt % tin. In a further embodiment, the mixture has a eutectic composition.

In one embodiment, the melt is a mixture consisting of lead and tin and possibly unavoidable impurities. Any suitable composition and, thus, density of the mixture may be utilized. However, in one embodiment the density of the melt consisting of a mixture consisting of lead and tin, and possibly unavoidable impurities, is in the range of from 7.5 g/cm$^3$ to 9.5 g/cm$^3$. In another embodiment the density of the melt consisting of a mixture consisting of lead and tin, and possibly unavoidable impurities, is in the range of from 7.5 g/cm$^3$ to 8.5 g/cm$^3$. Furthermore, the composition of the mixture consisting of lead and tin, and possibly unavoidable impurities, may be selected such that the mixture has a low solidification temperature, whereby a low process temperature may be utilized. For example, the mixture may have such a composition that the solidification temperature of the mixture is <200° C. In one embodiment the mixture includes 58.0-70.0 wt % tin and 30.0-42.0 wt % lead. In another embodiment the mixture includes 60.0-65.0 wt % tin and 35.0-40.0 wt % lead. In a further embodiment, the mixture has a eutectic composition.

In one embodiment, the melt consists of a mixture consisting of bismuth and lead and possibly unavoidable impurities. Any suitable composition and, thus, density of the mixture may be utilized. However, in one embodiment the density of the melt consisting of a mixture consisting of bismuth and lead, and possibly unavoidable impurities, is in the range of from 10.2 g/cm$^3$ to 10.5 g/cm$^3$. Furthermore, the composition of the mixture consisting of bismuth and lead, and possibly unavoidable impurities, may be selected such that the mixture has a low solidification temperature, whereby a low process temperature may be utilized. For example, the mixture may have such a composition that the solidification temperature of the mixture is <200° C., or <175° C., or <150° C. In one embodiment the mixture includes 35.0-70.0 wt % bismuth and 30.0-65.0 wt % lead. In another embodiment the mixture includes 50.0-60.0 wt % bismuth and 40.0-50.0 wt % lead. In a further embodiment, the mixture has a eutectic composition.

In one embodiment, the melt consists of a mixture consisting of bismuth, lead and tin and possibly unavoidable impurities. Any suitable composition and, thus, density of the mixture may be utilized. However, in one embodiment the density of the melt consisting of a mixture consisting of bismuth, lead and tin, and possibly unavoidable impurities, is in the range of from 8.5 g/cm$^3$ to 9.5 g/cm$^3$. Furthermore, the composition of the mixture consisting of bismuth, lead and tin, and possibly unavoidable impurities, may be selected such that the mixture has a low solidification temperature, whereby a low process temperature may be utilized. For example, the mixture may have such a composition that the solidification temperature of the mixture is <150° C. or <125° C. In one embodiment the mixture includes 50.0-57.5 wt % bismuth, 25.0-35.0 wt % tin and 8.5-25.0 wt % lead. In a further embodiment, the mixture has a eutectic composition.

The bodies of the collection to be sorted may be of various types, sizes and shapes. For example, the bodies of the collection may be cutting tools, such as inserts for cutting metal, wood, stone, etc., drills, end mills, mining tools and/or wear parts.

The bodies of the collection to be sorted may be coated or uncoated. Thus, for example, a "cemented carbide body" may include a cemented carbide substrate that is coated or uncoated.

Optionally, a layer of glycerol may be provided on the top surface of the melt in order to enhance the purity during the separation steps. The glycerol layer works as a washing agent, i.e. it prevents residues of the melt to be stuck on the surfaces of the bodies separated from the melt during the third and fourth treatments steps 103, 104. In addition, the glycerol layer prevents vaporization of the melt. The glycerol layer may be provided on the top surface of the melt before the sorting process or after the sorting process but before the separation steps.

Optionally, a magnet may be utilized in order to break the surface tension of the melt upon provision of the collection of bodies to be sorted in the melt and in order to pull the bodies of the collection to be sorted down into the melt before the sorting process, i.e. before the bodies are allowed to sink to the bottom of the melt or rise to the top surface to the melt.

Optionally, the melt may be stirred by means of, for example, magnetic or mechanical means, such that the bodies of the collection to be sorted are circulated in the melt during the sorting process.

Optionally, the method according to the disclosure may also include one or more pre-treatment steps. The method according to the disclosure may optionally include a pre-treatment step involving removal of coatings on the bodies by means of any suitable method before the bodies are provided in the melt. The method according to the disclosure may also optionally include a pre-treatment step involving washing of the collection of bodies to be sorted before the collection is provided in the melt. The washing is performed in order to remove any loose particles and fluid residues, e.g. oil and cutting fluid residues, from the surfaces. Furthermore, the method according to the disclosure may optionally include a pre-treatment step involving a manual preliminary sorting and removal of obvious unwanted and visible objects in the collection of bodies to be sorted before the collection is provided in the melt. In addition, the method according to the disclosure may optionally include a pre-treatment step involving a magnetic separation, suitably in a magnetic separator drum, for sorting out bodies comprising magnetic material, in particular iron or iron-containing materials, from the collection of bodies to be sorted before the collection is provided in the melt.

Furthermore, the present disclosure relates to a method for recycling of cemented carbides. The method for recycling of cemented carbides includes a first step of sorting a collection of bodies including cemented carbide bodies and non-cemented carbide bodies according to the sorting method of the present disclosure so as to obtain a first group of bodies comprising non-cemented carbide bodies and a second group of bodies comprising cemented carbide bodies. Furthermore, the method for recycling of cemented carbides includes a second step of recycling the second group of bodies. The recycling may be performed by utilization of any suitable method known in the art such as e.g. degradation to powder by a chemical, metallurgical or mechanical process. For example, the "cold stream process" or the "zinc process" may be utilized.

EXAMPLES

Example 1

Bismuth metal in an amount of 9.8 kg was heated to 300° C. in a steel container. Due to the melting point of bismuth, 271.5° C., all bismuth was melted. Tin metal in an amount of 5.5 kg was then added to the molten bismuth to prepare an alloy containing 64 wt % bismuth and 36 wt % tin. Due to the melting point of tin, 231.9° C., all tin was melted and a liquid bismuth-tin alloy was formed.

The bismuth-tin alloy was then allowed to cool and solidify. After solidification the alloy was heated until the alloy was transformed to its molten state. The alloy was transformed to a melt at 170° C. The liquid density of the melt was 9.0 g/cm$^3$.

The melt was heated to 200° C. and a collection of discarded tools consisting of cemented carbide inserts, cermet inserts and ceramic inserts was thereafter added to the melt of bismuth-tin alloy. A first group of bodies having a density less than the density of the melt was then obtained floating on the surface of the melt, whereas a second group of bodies having a density higher than the density of the melt sunk to the bottom of the container. The first and second group of bodies were thereafter separated from the melt. It was determined that the first group of bodies contained the cermet bodies and ceramic bodies of the collection and that the second group of bodies contained the cemented carbide bodies of the collection.

While the disclosure has been described in connection with various exemplary embodiments, it is to be understood that the disclosure is not to be limited to the disclosed exemplary embodiments, on the contrary, it is intended to cover various modifications and equivalent arrangements within the appended claims. Furthermore, it should be recognized that any disclosed form or embodiment of the disclosure may be incorporated in any other disclosed or described or suggested form or embodiment as a general matter of design choice. It is the intention, therefore, to be limited only as indicated by the scope of the appended claims.

The invention claimed is:

1. A method for sorting a collection of bodies including cemented carbide bodies and non-cemented carbide bodies, the method comprising the steps of:
    providing a melt including one or more of bismuth, tin and lead and having a density in the range of from 7.0 g/cm$^3$ to 12.0 g/cm$^3$;
    subjecting said collection to a sorting process based on a density difference by providing said collection in said melt and allowing said collection to be sorted into a first group of bodies collected at a top surface of said melt and a second group of bodies collected at a bottom of said melt based on said density difference, said first group of bodies comprising non-cemented carbide bodies of said collection having a density lower than said density of said melt and said second group of bodies comprising cemented carbide bodies having a density higher than said density of said melt, the sorting process being based on the density difference between the density of the melt and the density of the bodies;
    separating said first group of bodies from said melt; and
    separating said second group of bodies from said melt.

2. The method according to claim 1, wherein said melt has a density in the range of from 8.0 g/cm$^3$ to 11.0 g/cm$^3$.

3. The method according to claim 1, wherein said melt has a density in the range of from 8.0 g/cm3 to 10.0 g/cm3.

4. The method according to claim 1, wherein said melt has a density in the range of from 8.5 g/cm$^3$ to 9.5 g/cm$_3$.

5. The method according to claim 1, wherein said melt comprises one or more of bismuth, tin and lead.

6. The method according to claim 5, wherein said melt is selected from the group of a mixture consisting of bismuth and tin, a mixture consisting of bismuth and lead, a mixture consisting of lead and tin, and a mixture consisting of bismuth, lead and tin.

7. The method according to claim 6, wherein said melt comprises a mixture of bismuth and tin and having a density in the range of from 8.0 g/cm$^3$ to 9.5 g/cm$^3$.

8. The method according to claim 6, wherein said melt comprises a mixture of lead and tin and having a density in the range of from 7.5 g/cm$^3$ to 9.5 g/cm$^3$.

9. The method according to claim 6, wherein said melt comprises a mixture of bismuth and lead and having a density in the range of from 10.2 g/cm$^3$ to 10.5 g/cm$^3$.

10. The method according to claim 6, wherein said melt comprises a mixture of bismuth, tin and lead and having a density in the range of from 8.5 g/cm$^3$ to 9.5 g/cm$^3$.

11. The method according to claim 6, wherein said mixture is of eutectic composition.

12. The method according to claim 1, wherein the temperature of said melt is <400° C.

13. The method according to claim 1, wherein the method further comprises a step of providing a layer of glycerol on the top surface of said melt.

14. The method according to claim 1, wherein said melt is stirred during said sorting process.

15. The method according to claim 1, wherein said non-cemented carbide bodies comprises cermet bodies.

16. A method for recycling of cemented carbides comprising the steps of:
    providing a melt including one or more of bismuth, tin and lead and having a density in the range of from 7.0 g/cm$^3$ to 12.0 g/cm$^3$;

sorting a collection of bodies including cemented carbide bodies and non-cemented carbide bodies so as to obtain a separate first group of bodies comprising non-cemented carbide bodies and a separate second group of bodies comprising cemented carbide bodies;
subjecting said collection to a sorting process based on a density difference by providing said collection in said melt and allowing said collection to be sorted into the first group of bodies collected at a top surface of said melt and a second group of bodies collected at a bottom of said melt based on said density difference, said first group of bodies comprising non-cemented carbide bodies of said collection having a density lower than said density of said melt and said second group of bodies comprising cemented carbide bodies having a density higher than said density of said melt, the sorting process being based on the density difference between the density of the melt and the density of the bodies;
separating said first group of bodies from said melt;
separating said second group of bodies from said melt; and
recycling said second group of bodies.

* * * * *